US012525758B2

(12) United States Patent
Hitchcock et al.

(10) Patent No.: US 12,525,758 B2
(45) Date of Patent: Jan. 13, 2026

(54) CHARGING INLET ASSEMBLY HAVING MODULAR TERMINAL ASSEMBLIES

(71) Applicant: TE Connectivity Solutions GmbH, Schaffhausen (CH)

(72) Inventors: Matthew Bryan Hitchcock, Hershey, PA (US); Kevin John Peterson, Kernersville, NC (US); Clara Marguerite Rhodes, Winston Salem, NC (US); Aaron James de Chazal, Rochester, MI (US); Joshua T. Shoemaker, Winston Salem, NC (US)

(73) Assignee: TE Connectivity Solutions GmbH (CH)

( * ) Notice: Subject to any disclaimer, the term of this patent is extended or adjusted under 35 U.S.C. 154(b) by 351 days.

(21) Appl. No.: 18/159,653

(22) Filed: Jan. 25, 2023

(65) Prior Publication Data

US 2023/0246405 A1 Aug. 3, 2023

Related U.S. Application Data

(60) Provisional application No. 63/305,753, filed on Feb. 2, 2022.

(51) Int. Cl.
| | |
|---|---|
| H01R 27/02 | (2006.01) |
| B60L 53/16 | (2019.01) |
| H01R 13/424 | (2006.01) |
| H01R 13/432 | (2006.01) |
| H01R 13/512 | (2006.01) |
| H01R 13/52 | (2006.01) |
| H02J 7/00 | (2006.01) |

(52) U.S. Cl.
CPC .............. *H01R 27/02* (2013.01); *B60L 53/16* (2019.02); *H01R 13/424* (2013.01); *H01R 13/432* (2013.01); *H01R 13/512* (2013.01); *H01R 13/5205* (2013.01); *H02J 7/0045* (2013.01); *H01R 2201/26* (2013.01)

(58) Field of Classification Search
None
See application file for complete search history.

(56) References Cited

U.S. PATENT DOCUMENTS

2019/0074620 A1* 3/2019 Moseke .................. B60L 53/16

FOREIGN PATENT DOCUMENTS

| KR | 20210128171 A | * 10/2021 |
| KR | 20220011427 A | * 1/2022 |

* cited by examiner

*Primary Examiner* — Tho D Ta

(57) ABSTRACT

A charging inlet assembly includes a housing extending between a front and a rear having a DC section configured for mating with a DC charging connector and an AC section configured for mating with an AC charging connector. The charging inlet assembly includes an AC charging module coupled to the rear of the housing at the AC section having an AC terminal holder holding AC terminals. The AC charging module is removable from the housing wherein the AC terminals are removed from the housing with the AC terminal holder. A DC charging module is coupled to the rear of the housing at the DC section having a DC terminal holder holding DC terminals. The DC charging module is removable from the housing wherein the DC terminals are removed from the housing with the DC terminal holder.

20 Claims, 10 Drawing Sheets

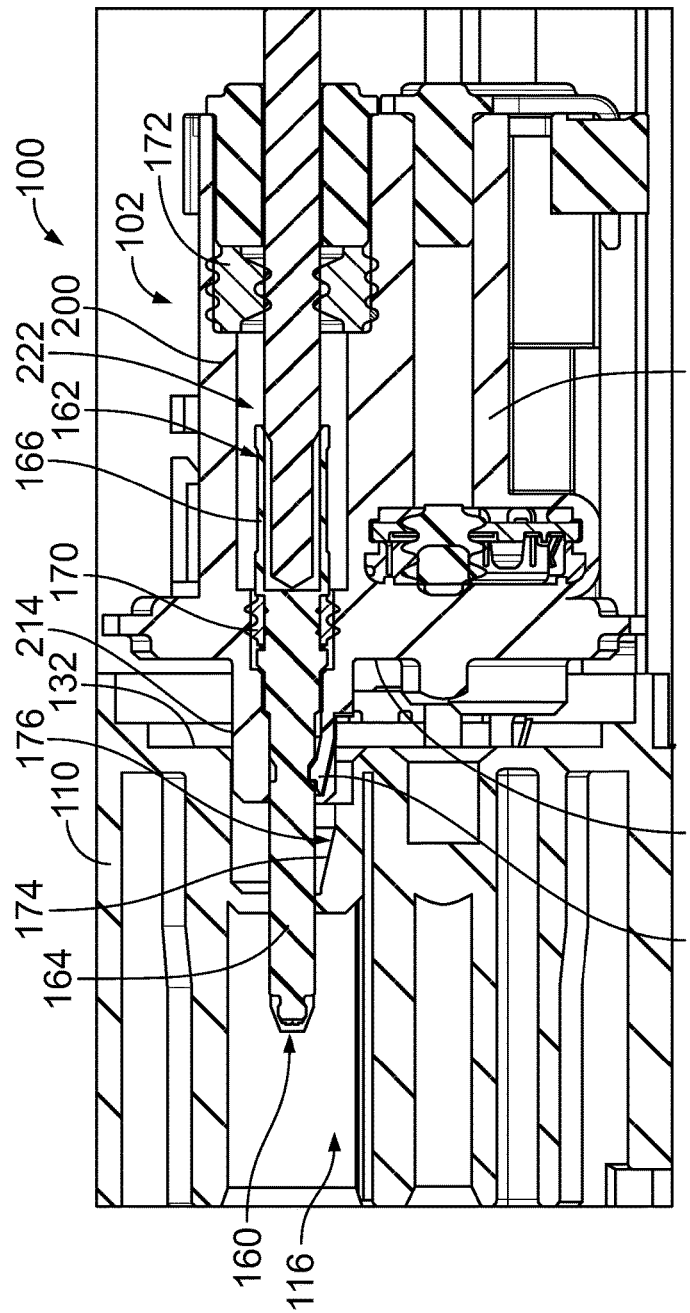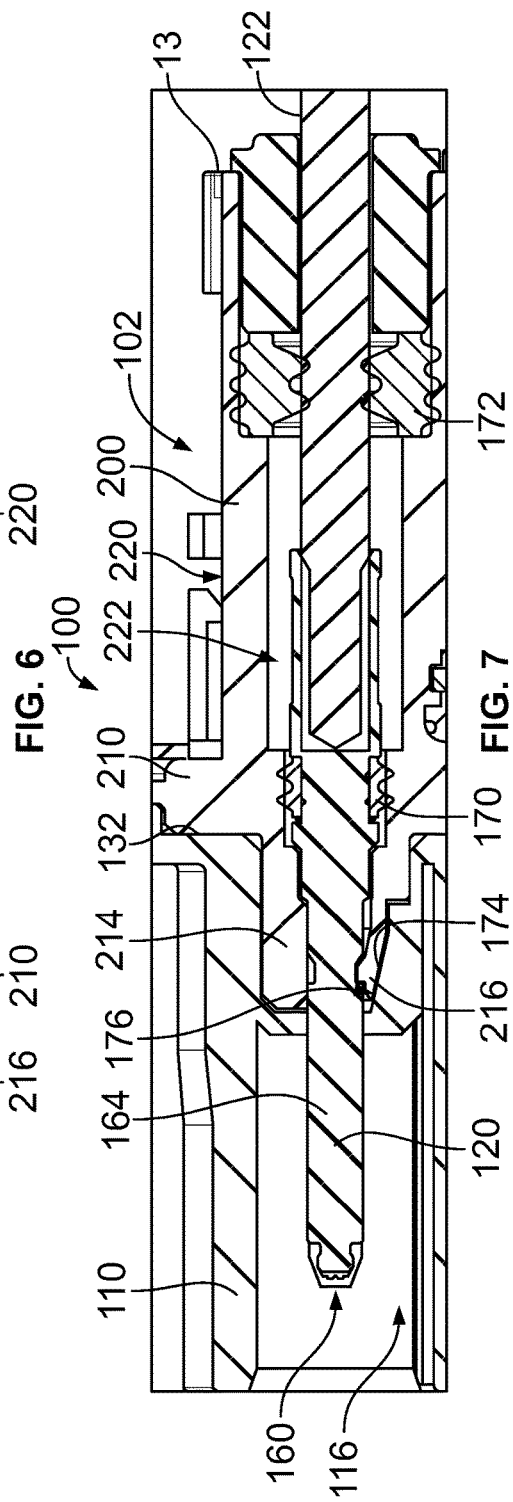

CHARGING INLET ASSEMBLY HAVING MODULAR TERMINAL ASSEMBLIES

CROSS REFERENCE TO RELATED APPLICATIONS

This application claims priority to U.S. Provisional Application No. 63/305,753, filed 2 Feb. 2022, the subject matter of which is herein incorporated by reference in its entirety.

BACKGROUND OF THE INVENTION

The subject matter herein relates generally to charging inlet assemblies.

Charging inlet assemblies are used to charge vehicles, such as for charging a battery system of an electric vehicle (EV) or hybrid electric vehicle (HEV). The charging inlet assembly includes power connectors for connecting to a charging connector. Conventional charging inlet assemblies include AC terminals and DC terminals. The AC terminals and the DC terminals are housed within an inlet housing, which interfaces with the charging connector. The inlet housing is coupled to the vehicle. Cable harnesses are coupled to the AC terminals and the DC terminals and extend to other system components, such as the battery. The AC terminals and the DC terminals are coupled to the housing using latches. The power cables extend from the AC terminals and the DC terminals to the battery or other system component. However, servicing of the charging inlet assembly and the terminals and cable harness is difficult. Service typically involves disassembly and removal of the charging inlet assembly from the vehicle for service. The terminals are individually removed from the housing, which is time consuming.

A need remains for an improved charging inlet assembly.

BRIEF DESCRIPTION OF THE INVENTION

In one embodiment, a charging inlet assembly is provided and includes a housing extending between a front and a rear. The housing has a DC section and an AC section. The DC section configured for mating with a DC charging connector at the front. The AC section configured for mating with an AC charging connector at the front. The charging inlet assembly includes an AC charging module coupled to the rear of the housing at the AC section. The AC charging module includes an AC terminal holder holding AC terminals for mating with the AC charging connector. The AC charging module is removable from the housing wherein the AC terminals are removed from the housing with the AC terminal holder. The charging inlet assembly includes a DC charging module coupled to the rear of the housing at the DC section. The DC charging module includes a DC terminal holder holding DC terminals for mating with the DC charging connector. The DC charging module is removable from the housing wherein the DC terminals are removed from the housing with the DC terminal holder.

In another embodiment, a charging inlet assembly is provided and includes a housing extending between a front and a rear. The housing has a DC section and an AC section. The DC section configured for mating with a DC charging connector at the front. The AC section configured for mating with an AC charging connector at the front. The AC section includes an internal cavity. The charging inlet assembly includes an AC charging module coupled to the rear of the housing at the AC section. The AC charging module includes an AC terminal holder holding AC terminals for mating with the AC charging connector. The AC terminal holder includes a mating insert at a front of the AC charging module. The mating insert includes AC terminal channels holding the corresponding AC terminals. The mating insert is received in the internal cavity of the AC section of the housing. The AC terminal channels configured to receive AC charging terminals of the AC charging connector. The AC charging module is removable from the housing wherein the AC terminals are removed from the housing with the AC terminal holder. The charging inlet assembly includes a DC charging module coupled to the rear of the housing at the DC section. The DC charging module includes a DC terminal holder holding DC terminals for mating with the DC charging connector. The DC charging module is removable from the housing wherein the DC terminals are removed from the housing with the DC terminal holder.

In a further embodiment, a charging inlet assembly is provided and includes a housing extending between a front and a rear. The housing has a DC section and an AC section. The DC section includes a DC position assurance device. The DC section configured for mating with a DC charging connector at the front. The AC section includes an AC position assurance device. The AC section configured for mating with an AC charging connector at the front. The charging inlet assembly includes an AC charging module coupled to the rear of the housing at the AC section. The AC charging module includes an AC terminal holder holding AC terminals for mating with the AC charging connector. The AC charging module interfaces with the AC position assurance device to assure that the AC charging module is properly loaded in the housing, wherein the AC charging module is removable from the housing. The AC terminals are removed from the housing with the AC terminal holder. The charging inlet assembly includes a DC charging module coupled to the rear of the housing at the DC section. The DC charging module includes a DC terminal holder holding DC terminals for mating with the DC charging connector, wherein the DC charging module interfaces with the DC position assurance device to assure that the DC charging module is properly loaded in the housing. The DC charging module is removable from the housing. The DC terminals are removed from the housing with the DC terminal holder.

BRIEF DESCRIPTION OF THE DRAWINGS

FIG. 6 is a cross sectional view of a portion of the charging inlet assembly showing the AC charging module partially loaded into the housing in accordance with an exemplary embodiment.

FIG. 7 is a cross sectional view of a portion of the charging inlet assembly showing the AC charging module fully loaded into the housing in accordance with an exemplary embodiment.

DETAILED DESCRIPTION OF THE INVENTION

Figure 1:
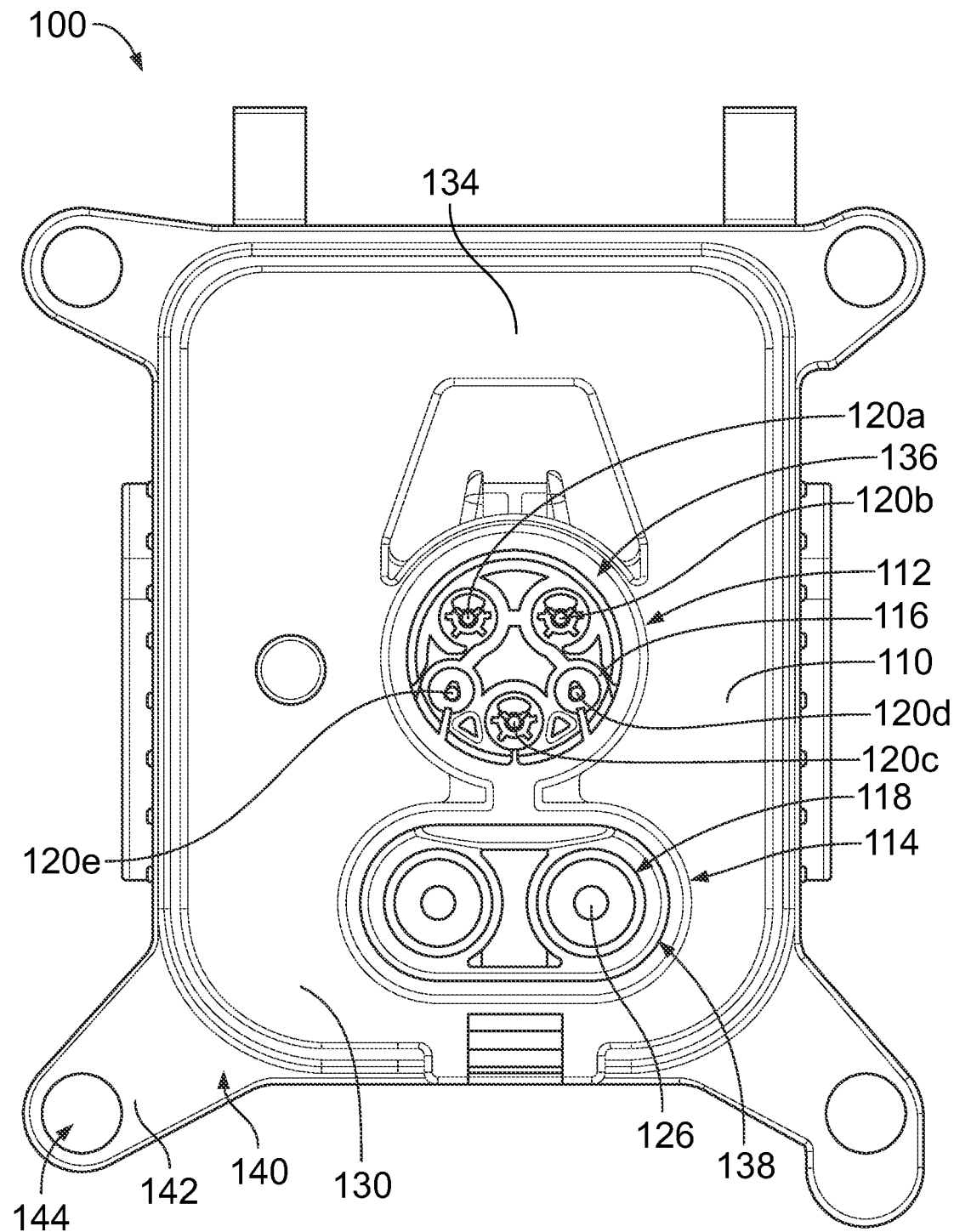
FIG. 1 is a front view of a charging inlet assembly including an AC charging module and a DC charging module in accordance with an exemplary embodiment.
Figure 2:
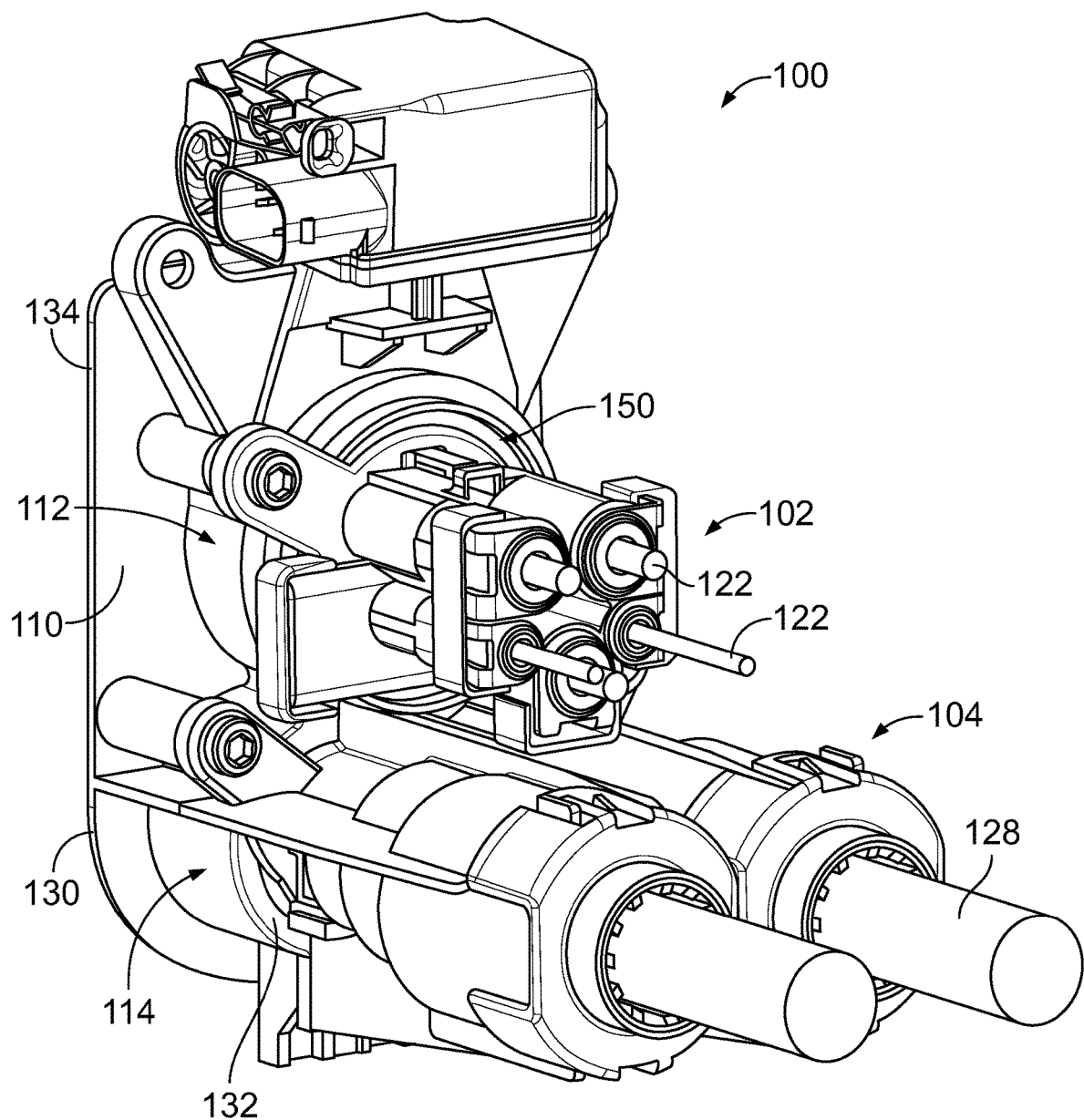
FIG. 2 is a rear perspective view of the charging inlet assembly showing the AC charging module and the DC charging module in accordance with an exemplary embodiment.

FIG. 1 is a front view of a charging inlet assembly 100 including an AC charging module 102 and a DC charging module 104 in accordance with an exemplary embodiment. FIG. 2 is a rear perspective view of the charging inlet assembly 100 showing the AC charging module 102 and the DC charging module 104 in accordance with an exemplary embodiment.

The charging inlet assembly 100 is used as a charging inlet for a vehicle, such as an electric vehicle (EV) or hybrid electric vehicle (HEV). The charging inlet assembly 100 is configured for mating reception with a charging connector (not shown). In an exemplary embodiment, the charging inlet assembly 100 is configured for mating with various types of charging connectors, such as a DC fast charging connector (for example, the SAE combo CCS charging connector) in addition to AC charging connectors (for example, the SAE J1772 charging connector).

The charging inlet assembly 100 includes a housing 110 configured to be mounted in the vehicle. The housing 110 holds the AC charging module 102 and the DC charging module 104 for mating with the charging connector. In various embodiments, the AC charging module 102 and/or the DC charging module 104 are removable from the housing 110. For example, the charging modules 102 may be coupled to the housing 110 using latches, fasteners, clips, or other securing means. The charging modules 102, 104 may be removable from the housing 110 to separate components of the charging modules 102, 104 (for example, charging pins, cables, circuit boards, and the like) from the housing 110, such as for repair and/or replacement of the charging module components or other components of the charging inlet assembly 100.

In an exemplary embodiment, the housing 110 includes an AC section 112 that receives the AC charging module 102 and a DC section 114 that receives the DC charging module 104. The AC section 112 is configured for mating with an AC charging connector or an AC section of the charging connector. The DC section 114 is configured for mating with a DC charging connector or a DC section of the charging connector. The AC section 112 includes AC terminal channels 116. The DC section 114 includes DC terminal channels 118.

The AC charging module 102 includes AC terminals 120 at the AC section 112. The AC terminals 120 are held in the housing 110 by the AC charging module 102. The AC terminals 120 are received in corresponding AC terminal channels 116. The AC terminals 120 are configured to be mated to the charging connector. In the illustrated embodiment, five AC terminals 120 are provided, including a first AC charging terminal 120*a*, a second AC charging terminal 120*b*, a ground terminal 120*c*, a proximity terminal 120*d*, and a pilot terminal 120*e*. Optionally, the AC terminals 120 may be different sized terminals. In an exemplary embodiment, the AC terminals 120 includes pins at mating ends of the AC terminals 120. AC cables 122 are terminated to the AC terminals 120 and extend from the charging inlet assembly 100 to another component of the vehicle, such as the battery system of the vehicle. In various embodiments, the AC cables 122 may extend straight away from the AC charging module 102 and housing 110. In other various embodiments, the AC cables 122 may extend away from the AC charging module 102 and housing 110 at 90° (for example, right angle) or at other angles.

In an exemplary embodiment, the AC section 112 of the charging inlet assembly 100 defines a low-voltage connector configured to be coupled to the low-voltage portion of the charging connectors. The low-voltage connector (for example, the AC terminals 120 and the AC cables 122) is configured to be coupled to other components in the system, such as a battery distribution unit, to control charging of the vehicle. The low-voltage connector may transmit/receive signals relating to charging, such as status of connection, status of charge, voltage of charge, and the like. The low-voltage connector may be socket connector configured to receive the charging plug. Seals may be provided at the interface of the low-voltage connector.

The DC charging module 104 includes DC terminals 126 at the DC section 114. The DC terminals 126 are held in the housing 110 by the DC charging module 104. The DC terminals 126 are received in corresponding DC terminal channels 118. The DC terminals 126 are configured to be mated to the charging connector. In the illustrated embodiment, two DC terminals 126 are provided. In an exemplary embodiment, the DC terminals 126 include pins at mating ends of the DC terminals 126. DC cables 128 are terminated to the DC terminals 126 and extend from the charging inlet assembly 100 to another component of the vehicle, such as the battery system of the vehicle. In various embodiments, the DC cables 128 may extend straight away from the DC charging module 104 and housing 110. In other various embodiments, the DC cables 128 may extend away from the DC charging module 104 and housing 110 at 90° (for example, right angle) or at other angles.

In an exemplary embodiment, the DC section 114 of the charging inlet assembly 100 defines a high-voltage connector configured to be coupled to the high-voltage portion of the charging connector. The high-voltage connector (for example, the DC terminals 126 and the DC cables 128) is configured to be coupled to other components in the system, such as the battery and/or the battery distribution unit of the vehicle. The high-voltage connector is used for fast charging of the battery. The high-voltage connector may be a socket connector configured to receive the charging plug. Seals may be provided at the interface of the high-voltage connector.

The housing 110 includes a front 130 and a rear 132. The front 130 of the housing 110 faces outward and is presented to the operator to connect the charging connector. The rear 132 faces the interior of the vehicle and is generally inaccessible without removing the housing 110 from the vehicle. The housing 110 includes a panel 134 at the front 130. In an exemplary embodiment, an AC socket 136 is formed in the panel 134 at the AC section 112 and a DC socket 138 is formed in the panel 134 at the DC section 114. The AC socket 136 incudes a space around the AC terminals 120 that receives the charging connector. During charging, the AC charging connector is plugged into the AC socket 136 to electrically connect to the AC terminals 120. The DC socket 138 includes a space around the DC terminals 126 that receive the charging connector. The DC charging connector is configured to be plugged into the DC socket 138. During charging, the DC charging connector is plugged into the DC socket 138 to electrically connect to the DC terminals 126. The panel 134 may surround the AC socket 136 and the DC socket 138 at the front 130.

In an exemplary embodiment, the housing 110 includes one or more cavities 150 at the rear 132 that receive the AC charging module 102 and the DC charging module 104. In an exemplary embodiment, the charging inlet assembly 100 includes a proximity resistor assembly 124 at the rear of the housing 110. In an exemplary embodiment, the proximity resistor assembly 124 provides a resistor between the proximity terminal 120d and the ground terminal 120c, such as for operating a signaling protocol for performing the charging operation. In an exemplary embodiment, the proximity resistor assembly 124 is part of the AC charging module 102. For example, the proximity resistor assembly 124 is side loaded into the AC charging module 102 to mate with the proximity terminal 120d and the ground terminal 120c.

In an exemplary embodiment, the housing 110 includes a mounting flange 140 (FIG. 1) coupled to the panel 134 at the front 130. The mounting flange 140 includes mounting tabs 142 used for mounting the housing 110 to the vehicle. The mounting tabs 142 having openings 144 that receive fasteners (not shown) to secure the charging inlet assembly 100 to the vehicle. Other types of mounting features may be used to secure the charging inlet assembly 100 to the vehicle. The housing 110 and/or the mounting flange may include a seal (not shown) to seal the charging inlet assembly 100 to the vehicle.

In various embodiments, the charging inlet assembly 100 may include a terminal cover (not shown) at the front of the housing 110 to cover portions of the housing 110, such as the DC section 114 and/or the AC section 112. The housing 110 may include one or more rear covers at the rear of the housing 110 to close access to the rear of the housing 110. The cover(s) may be clipped or latched onto the main part of the housing 110, such as using clips or latches. Other types of securing features, such as fasteners may be used in alternative embodiments.

Figure 3:
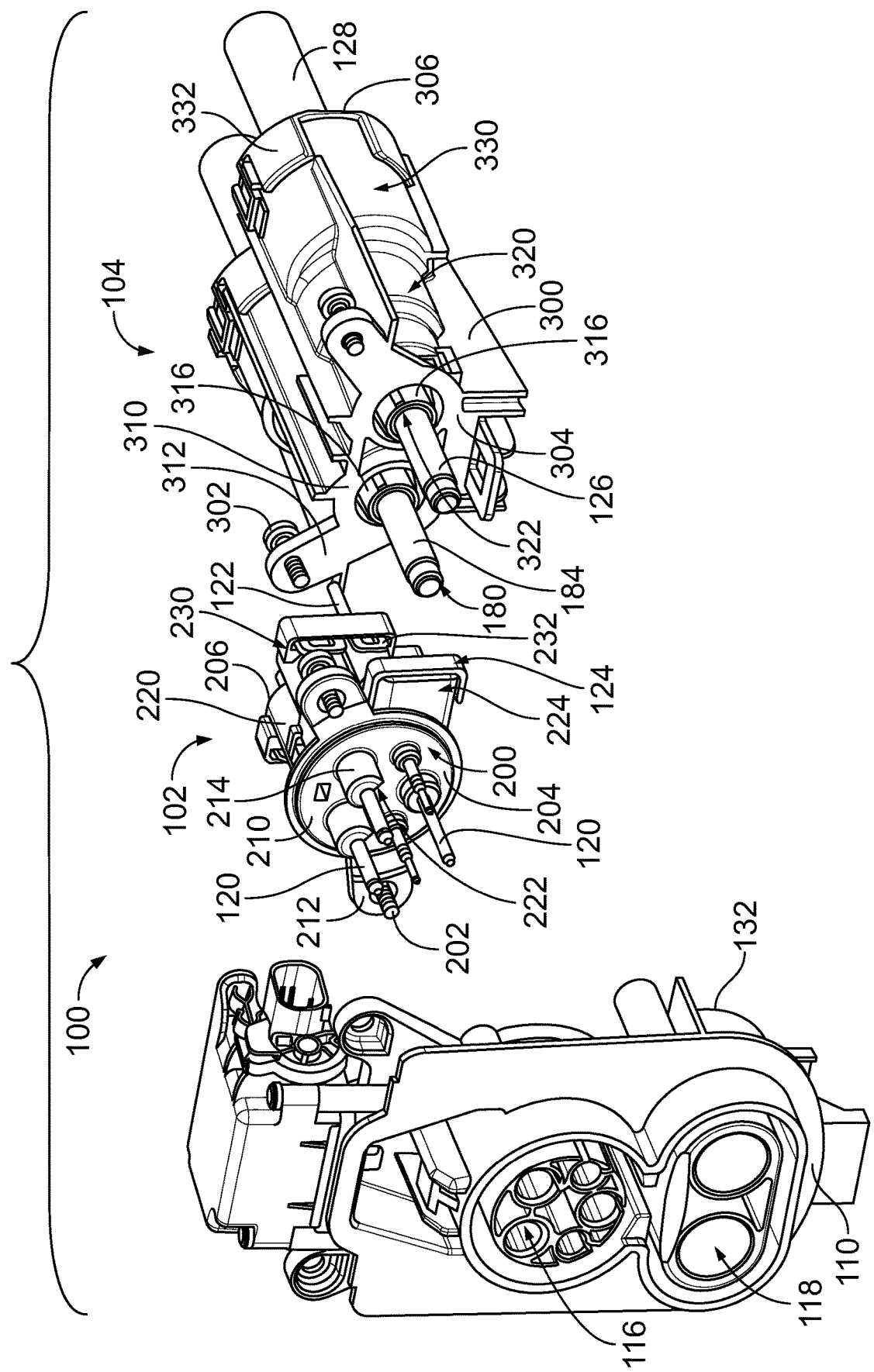
FIG. 3 is a front perspective, exploded view of a portion of the charging inlet assembly showing the AC charging module and the DC charging module in accordance with an exemplary embodiment.
Figure 4:
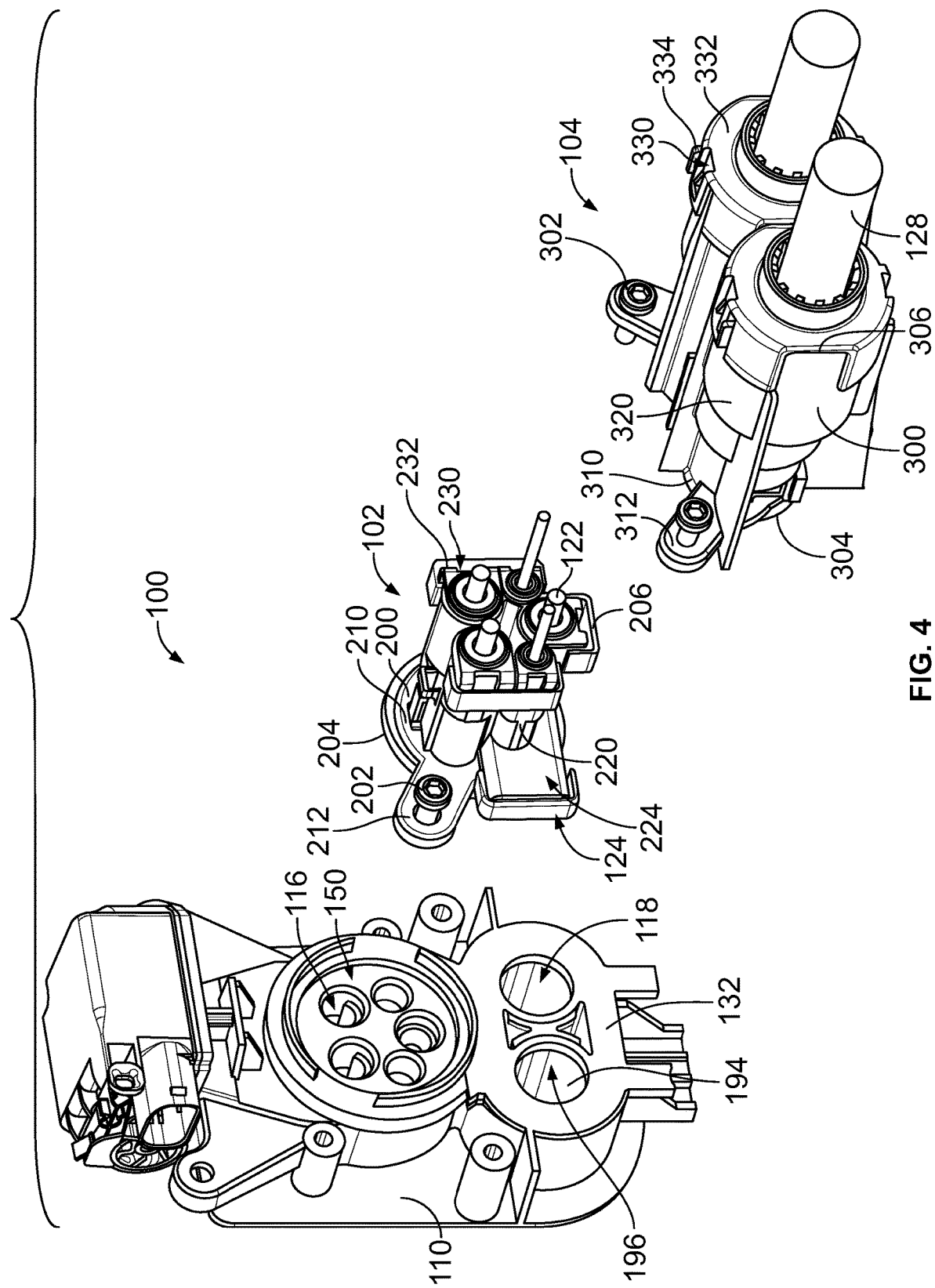
FIG. 4 is a rear perspective, exploded view of a portion of the charging inlet assembly showing the AC charging module and the DC charging module in accordance with an exemplary embodiment.

FIG. 3 is a front perspective, exploded view of a portion of the charging inlet assembly 100 showing the AC charging module 102 and the DC charging module 104 in accordance with an exemplary embodiment. FIG. 4 is a rear perspective, exploded view of a portion of the charging inlet assembly 100 showing the AC charging module 102 and the DC charging module 104 in accordance with an exemplary embodiment.

The AC charging module 102 is configured to be removably coupled to the housing 110 at the rear 132. The AC charging module 102 includes an AC terminal holder 200 holding the AC terminals 120. The AC terminal holder 200 is a dielectric housing, such as a plastic housing, holding the AC terminals 120 relative to each other. The AC terminal holder 200 positions the AC terminals 120 for loading into the corresponding terminal channels 116 in the housing 110. The AC terminal holder 200 is secured to the housing 110 by one or more securing elements 202. For example, the securing elements 202 may be fasteners, latches, clips, or other types of securing elements. In the illustrated embodiment, the securing elements 202 include threaded fasteners, such as screws. The securing elements 202 are configured to be removed or released from the housing 110 to allow removal of the AC charging module 102 from the housing 110, such as for repair or replacement of the AC terminals 120.

The AC terminal holder 200 extends between a front 204 and a rear 206. The AC terminal holder 200 includes a base 210 at the front 204. The base 210 is configured to be coupled to the housing 110. In various embodiments, the base 210 includes mounting tabs 212 receiving the securing elements 202 to mount the AC terminal holder 200 to the housing 110. In an exemplary embodiment, at least a portion of the base 210 is plugged into the housing 110, such as into the corresponding cavity 150 at the rear 132. In an exemplary embodiment, the AC terminal holder 200 includes protrusions 214 extending forward of the base 210. The protrusions 214 support the AC terminals 120. The protrusions 214 are configured to be plugged into the housing 110, such as into corresponding terminal channels 116.

In an exemplary embodiment, the AC terminal holder 200 includes a terminal hub 220 extending rearward of the base 210. The terminal hub 220 holds the AC terminals 120. In an exemplary embodiment, the AC terminal holder 200 includes holder channels 222 extending through the AC terminal holder 200 between the front 204 and the rear 206. Each holder channel 222 holds the corresponding AC terminal 120. The holder channels 222 may be separated from each other by walls. The holder channels 222 extend through the terminal hub 220. The holder channels 222 extend through the base 210. The holder channels 222 extend through corresponding protrusions 214. In an exemplary embodiment, the AC terminal holder 200 includes a resistor assembly channel 224 that receives the resistor assembly 124. In the illustrated embodiment, the resistor assembly channel 224 is provided at the side of the terminal hub 220. Other locations are possible in alternative embodiments.

In an exemplary embodiment, the AC terminal holder 200 includes a cable port 230 at the rear 206. The AC cables 122 extend into the AC terminal holder 200 through the cable port 230 for termination to the corresponding AC terminals 120. In an exemplary embodiment, cable covers 232 are coupled to each of the AC cables 122. The cable covers 232 may include latches or clips to secure the cable covers 232 to the AC terminal holder 200. The cable covers 232 hold the AC cables 122 in the AC terminal holder 200. The cable covers 232 may provide strain relief for the AC cables 122. The cable covers 232 may hold cable seals in the AC terminal holder 200.

The DC charging module 104 is configured to be removably coupled to the housing 110 at the rear 132. The DC charging module 104 includes a DC terminal holder 300 holding the DC terminals 126. The DC terminal holder 300 is a dielectric housing, such as a plastic housing, holding the DC terminals 126 relative to each other. The DC terminal holder 300 positions the DC terminals 126 for loading into the corresponding terminal channels 118 in the housing 110. The DC terminal holder 300 is secured to the housing 110 by one or more securing elements 302. For example, the securing elements 302 may be fasteners, latches, clips, or other types of securing elements. In the illustrated embodiment, the securing elements 302 include threaded fasteners, such as screws. The securing elements 302 are configured to be removed or released from the housing 110 to allow removal of the DC charging module 104 from the housing 110, such as for repair or replacement of the DC terminals 126.

The DC terminal holder 300 extends between a front 304 and a rear 306. The DC terminal holder 300 includes a base 310 at the front 304. The base 310 is configured to be coupled to the housing 110. In various embodiments, the base 310 includes mounting tabs 312 receiving the securing elements 302 to mount the DC terminal holder 300 to the housing 110. In an exemplary embodiment, at least a portion of the base 310 is plugged into the housing 110. In various embodiments, the DC terminal holder 300 may include protrusions (not shown) extending forward of the base 310 for plugging into the corresponding terminal channels 118.

In an exemplary embodiment, the DC terminal holder 300 includes a terminal hub 320 extending rearward of the base 310. The terminal hub 320 holds the DC terminals 126. In an exemplary embodiment, the DC terminal holder 300 includes holder channels 322 extending through the DC terminal holder 300 between the front 304 and the rear 306. Each holder channel 322 holds the corresponding DC terminal 126. The holder channels 322 may be separated from each other by walls. The holder channels 322 extend through the terminal hub 320. The holder channels 322 extend through the base 310.

In an exemplary embodiment, the DC terminal holder 300 includes a cable port 330 at the rear 306. The DC cables 128 extend into the DC terminal holder 300 through the cable port 330 for termination to the corresponding DC terminals 126. In an exemplary embodiment, cable covers 332 are coupled to each of the DC cables 128. The cable covers 332 may include latches or clips to secure the cable covers 332 to the DC terminal holder 300. The cable covers 332 hold the DC cables 128 in the DC terminal holder 300. The cable covers 332 may provide strain relief for the DC cables 128.

The DC charging module 104 is configured to be removably coupled to the housing 110 at the rear 132. The DC terminals 126 are configured to be plugged into the housing 110 with the DC terminal holder 300 and are configured to be removed from the housing 110 with the DC terminal holder 300. In an exemplary embodiment, terminal seals (not shown) are used to seal between the DC terminals 126 and the DC terminal holder 300. Cable seals (not shown) are used to seal between the DC cable 128 and the DC terminal holder 300. The cable covers 332 hold the cable seals in the DC terminal holder 300.

Each DC terminal 126 includes a pin 184 at a mating end 180 of the DC terminal 126. The pin 184 extends forward of the DC terminal holder 300 into the terminal channel 118 of the housing 110. In an exemplary embodiment, the DC terminal holder 300 includes one or more latch 316 being latchably coupled to the DC terminal 126, such as to the pin 184. For example, a distal end of the latch 316 is received in a groove or channel in the pin 184. In various embodiments, a plurality of the latches 316 may circumferentially surround the pin 184 to secure the DC terminal 126 in the DC terminal holder 300. The latches 316 are deflectable.

In an exemplary embodiment, the housing 110 includes a latch block 194 configured to interface with the latch 316. The latch block 194 is located near the rear end of the terminal channel 118. The latch 316 is loaded into the terminal channel 118 to position the latch 316 adjacent the latch block 194. The latch block 194 holds the latch 316 in a latched position. For example, the latch block 194 restricts deflection of the latch 316 to an unlatched position. In the illustrated embodiment, the latch block 194 extends circumferentially around the terminal channel 118 to engage each of the latches 316 when the DC charging module 104 is plugged into the housing 110.

In an exemplary embodiment, the latch block 194 forms a DC position assurance device 196. The DC charging module 104 interfaces with the DC position assurance device 196 to assure that the DC charging module 104 is properly loaded in the housing 110. The DC position assurance device 196 assures that the DC charging module 104 is properly assembled. For example, the DC position assurance device 196 assures that the DC terminal 126 is properly positioned in the DC terminal holder 300. For example, when the DC terminal 126 is fully loaded into the DC terminal holder 300, the latch 316 snaps into the groove to the latched position. Prior to being fully loaded, the latch 316 is in an unlatched position and deflected outward. When deflected outward, the latch 316 does not fit in the terminal channel 118. For example, the latch block 194 would interfere with the latch 316 in the unlatched position thus restricting loading of the DC terminal holder 300 into the housing 110. As such, the latch block 194 forms the DC position assurance device 196.

Figure 5:
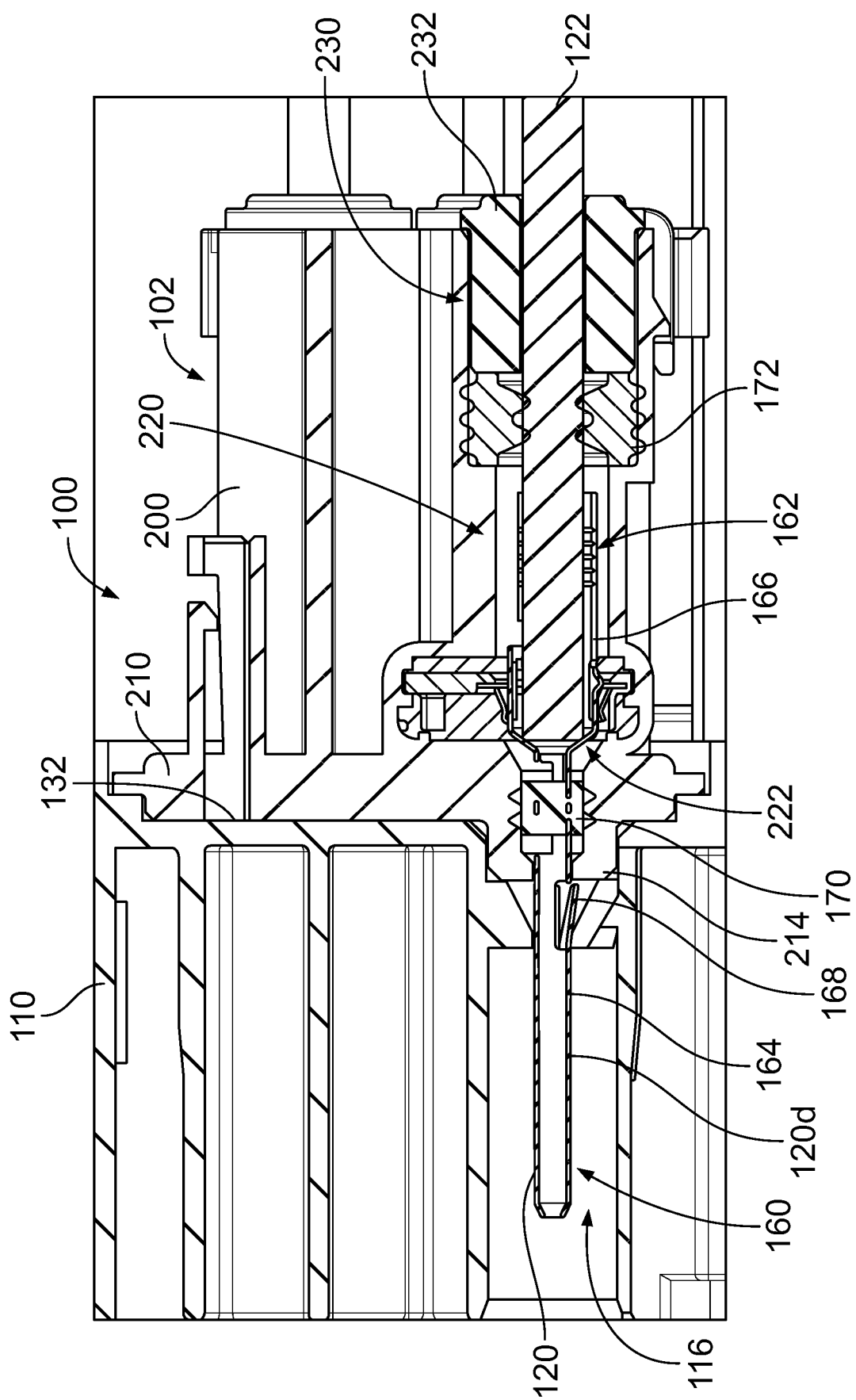
FIG. 5 is a cross sectional view of a portion of the charging inlet assembly showing the AC charging module coupled to the housing in accordance with an exemplary embodiment.

FIG. 5 is a cross sectional view of a portion of the charging inlet assembly 100 showing the AC charging module 102 coupled to the housing 110 in accordance with an exemplary embodiment. FIG. 5 shows the proximity terminal 120d. The AC charging module 102 is configured to be removably coupled to the housing 110 at the rear 132. The AC terminals 120 are configured to be plugged into the housing 110 with the AC terminal holder 200 and are configured to be removed from the housing 110 with the AC terminal holder 200.

The AC terminal holder 200 holds the AC terminals 120 in the holder channels 222. The base 210 of the AC terminal holder 200 is coupled to the rear 132 of the housing 110. The protrusions 214 extend forward of the base 210 and are configured to be plugged into the corresponding terminal channels 116 of the housing 110. The AC terminals 120 are held in the holder channels 222 and pass through the terminal hub 220, the base 210, and the protrusions 214. The AC cables 122 extend into the holder channels 222 and are terminated to the AC terminals 120.

In an exemplary embodiment, each AC terminal 120 extends between a mating end 160 and a terminating end 162. The AC terminal 120 includes a pin 164 at the mating end 160. The pin 164 is positioned in the terminal channel 116 of the housing 110 and configured to be mated to charging terminals of the AC charging connector. In an exemplary embodiment, the AC terminal 120 includes a crimp barrel 166 configured to be crimped to the AC cable 122. Other types of termination may be used in alternative embodiments, such as being welded to the AC cable 122.

In an exemplary embodiment, the AC terminal 120 includes a latch 168 for securing the AC terminal 120 in the AC terminal holder 200. The latch 168 is deflectable. In the illustrated embodiment, the latch 168 is provided along the pin 164 and is configured to engage the front of the AC terminal holder 200, such as to the front of the protrusion 214. The latch 168 may engage a different portion of the AC terminal holder 200, such as within the interior of the holder channel 222. In other alternative embodiments, rather than using the latch 168, a latch may extend from the AC terminal holder 200 to engage and secure the AC terminal 120 in the AC terminal holder 200.

In an exemplary embodiment, a terminal seal 170 is provided. The terminal seal 170 is sealingly coupled to the AC terminal 120. The terminal seal 170 is sealing coupled to the AC terminal holder 200. For example, the terminal seal 170 is sealed to the base 210.

In an exemplary embodiment, a cable seal 172 is provided. The cable seal 172 is sealingly coupled to the AC cable 122. The cable seal 172 is sealing coupled to the AC terminal holder 200. For example, the cable seal 172 is sealed to the terminal hub 220 and/or the cable port 230. The cable cover 232 holds the cable seal 172 in the holder channel 222.

FIG. 6 is a cross sectional view of a portion of the charging inlet assembly 100 showing the AC charging module 102 partially loaded into the housing 110 in accordance with an exemplary embodiment. FIG. 7 is a cross sectional view of a portion of the charging inlet assembly 100 showing the AC charging module 102 fully loaded into the housing 110 in accordance with an exemplary embodiment. FIG. 6 shows the AC charging terminal 120a. The AC charging module 102 is configured to be removably coupled to the housing 110 at the rear 132. The AC terminals 120 are configured to be plugged into the housing 110 with the AC terminal holder 200 and are configured to be removed from the housing 110 with the AC terminal holder 200.

The AC terminal holder 200 holds the AC terminal 120 in the holder channel 222. The base 210 of the AC terminal holder 200 is coupled to the rear 132 of the housing 110. The protrusion 214 extends forward of the base 210 and is configured to be plugged into the corresponding terminal channel 116 of the housing 110. The AC terminal 120 is held in the holder channel 222 and passes through the terminal hub 220, the base 210, and the protrusion 214. The terminal seal 170 is sealingly coupled to the AC terminal 120 and the AC terminal holder 200. The AC cable 122 extends into the holder channel 222 and is terminated to the AC terminal 120. The cable seal 172 is sealingly coupled to the AC cable 122 and the AC terminal holder 200.

The AC terminal 120 extends between the mating end 160 and the terminating end 162. The pin 164 at the mating end 160 extends forward of the AC terminal holder 200 into the terminal channel 116 of the housing 110. In an exemplary embodiment, the AC terminal holder 200 includes a latch 216 being latchably coupled to the AC terminal 120, such as to the pin 164. For example, a distal end of the latch 216 is received in a groove or channel in the pin 164. The latch 216 may be located along the bottom of the protrusion 214. The latch 216 secures the AC terminal 120 in the AC terminal holder 200. The latch 216 is deflectable.

In an exemplary embodiment, the housing 110 includes a latch block 174 configured to interface with the latch 216. The latch block 174 is located near the rear end of the terminal channel 116. The protrusion 214 is loaded into the terminal channel 116 to position the latch 216 adjacent the latch block 174. The latch block 174 holds the latch 216 in a latched position. For example, the latch block 174 restricts deflection of the latch 216 to an unlatched position. In the illustrated embodiment, the latch block 174 includes a ramped surface configured to interface with the latch 216 when the AC charging module 102 is plugged into the housing 110.

In an exemplary embodiment, the latch block 174 forms an AC position assurance device 176. The AC charging module 102 interfaces with the AC position assurance device 176 to assure that the AC charging module 102 is properly loaded in the housing 110. The AC position assurance device 176 assures that the AC charging module 102 is properly assembled. For example, the AC position assurance device 176 assures that the AC terminal 120 is properly positioned in the AC terminal holder 200. For example, when the AC terminal 120 is fully loaded into the AC terminal holder 200, the latch 216 snaps into the groove to the latched position. Prior to being fully loaded, the latch 216 is in an unlatched position and deflected outward. When deflected outward, the latch 216 does not fit in the terminal channel 116. For example, the latch block 174 would interfere with the latch 216 in the unlatched position thus restricting loading of the AC terminal holder 200 into the housing 110. As such, the latch block 174 forms the AC position assurance device 176.

Figure 8:
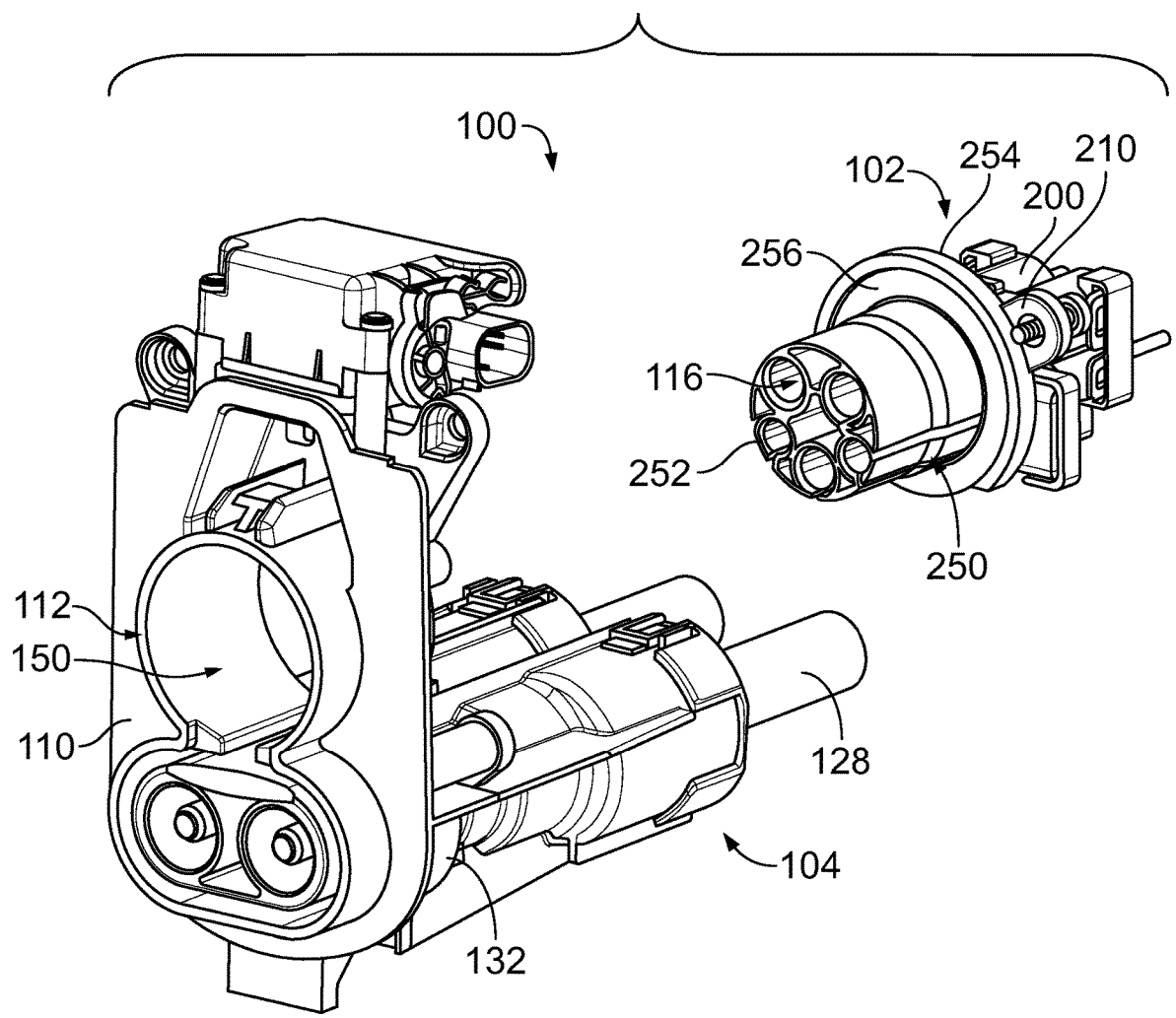
FIG. 8 is a front perspective, exploded view of a portion of the charging inlet assembly showing the AC charging module in accordance with an exemplary embodiment.
Figure 9:
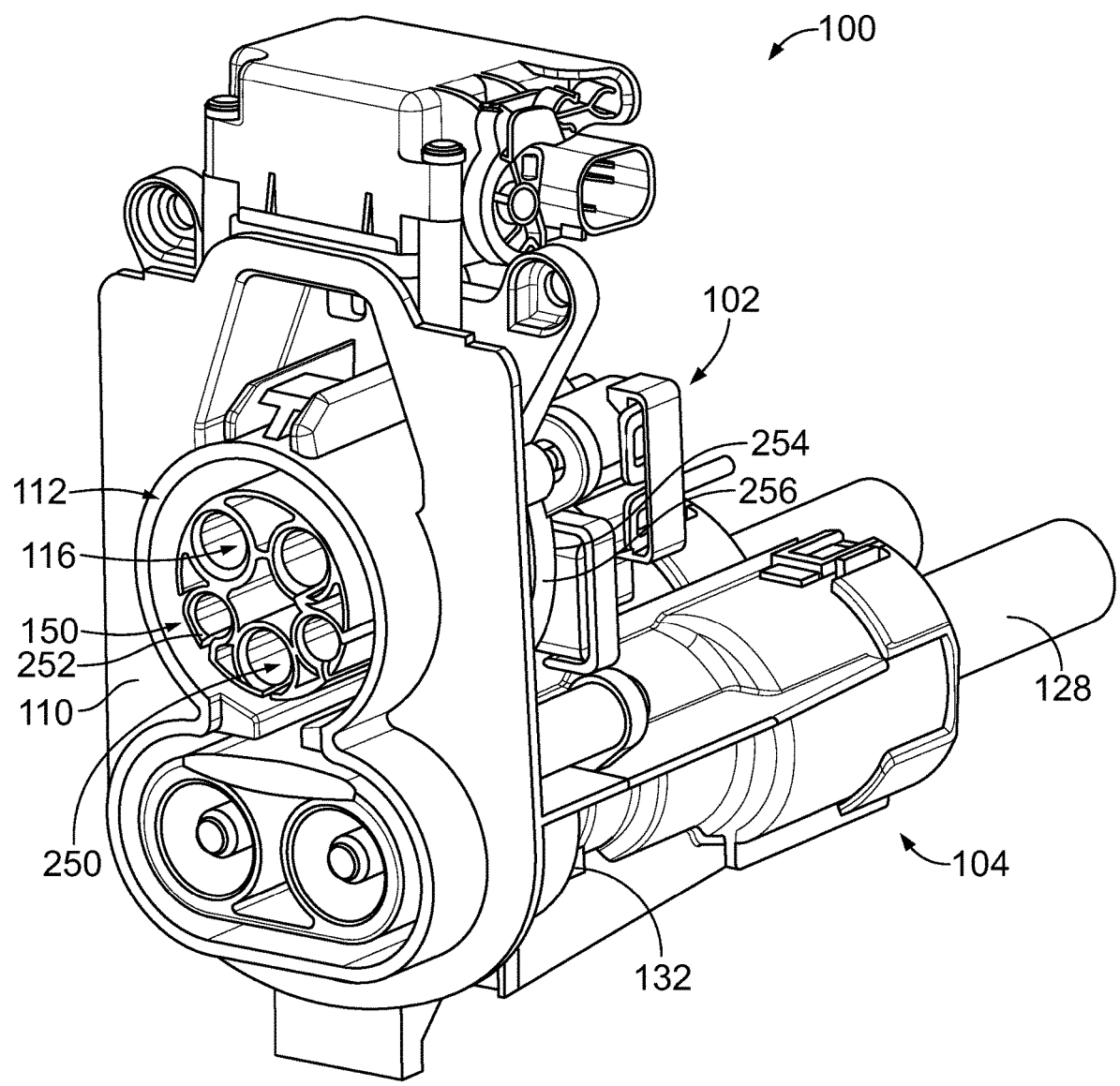
FIG. 9 is a front perspective view of a portion of the charging inlet assembly showing the AC charging module coupled to the housing in accordance with an exemplary embodiment.
Figure 10:
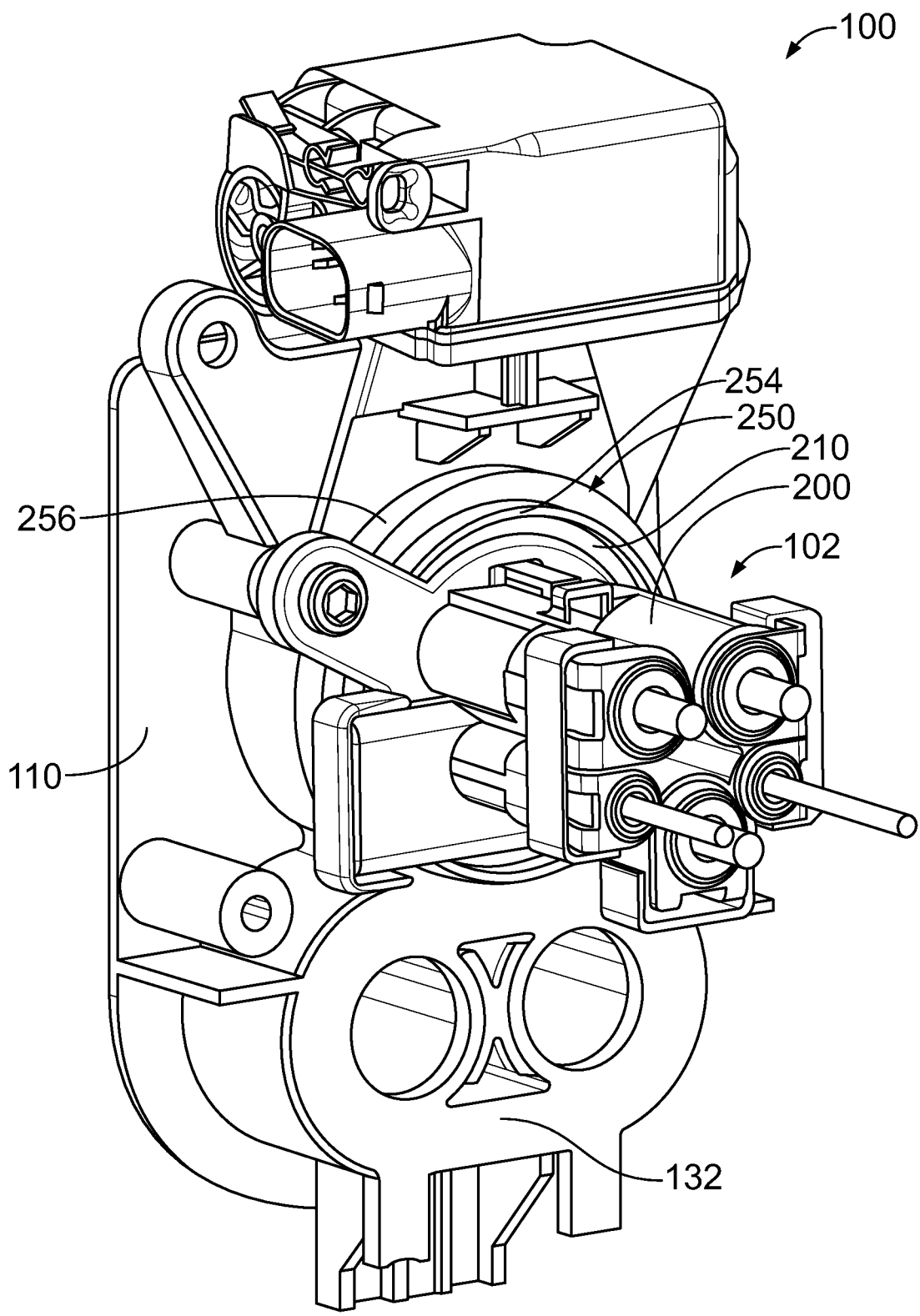
FIG. 10 is a rear perspective view of a portion of the charging inlet assembly showing the AC charging module coupled to the housing in accordance with an exemplary embodiment.

FIG. 8 is a front perspective, exploded view of a portion of the charging inlet assembly 100 showing the AC charging module 102 in accordance with an exemplary embodiment. FIG. 9 is a front perspective view of a portion of the charging inlet assembly 100 showing the AC charging module 102 coupled to the housing 110 in accordance with an exemplary embodiment. FIG. 10 is a rear perspective view of a portion of the charging inlet assembly 100 showing the AC charging module 102 coupled to the housing 110 in accordance with an exemplary embodiment. FIGS. 8 and 9 illustrate the DC charging module 104 with the DC cables 128 extending rearward from the DC charging module 104 (for example, parallel to the mating direction/loading direction).

The AC charging module 102 is configured to be removably coupled to the housing 110 at the rear 132. In an exemplary embodiment, the AC charging module 102 includes a mating insert 250 extending from the front of the AC terminal holder 200. In various embodiments, the mating insert 250 is separate and discrete from the AC terminal holder 200 and coupled thereto. In other embodiments, the mating insert 250 is integral with the AC terminal holder 200, such as being co-molded with the base 210. The mating insert 250 is configured to be received in the AC section 112 of the housing 110. For example, the mating insert 250 may be received in an internal cavity 150 of the housing 110.

In an exemplary embodiment, the mating insert 250 extends between a front 252 and a rear 254. The mating insert 250 includes a flange 256 at the rear 254. The flange 256 is configured to be coupled to the base 210. In the illustrated embodiment, the mating insert 250 is cylindrical. However, the mating insert 250 may have other shapes in alternative embodiments. The mating insert 250 includes the terminal channels 116 that receive the AC terminals 120. The mating insert 250, with the terminal channels 116, are removable from the housing 110 with the AC charging module 102.

Figure 11:
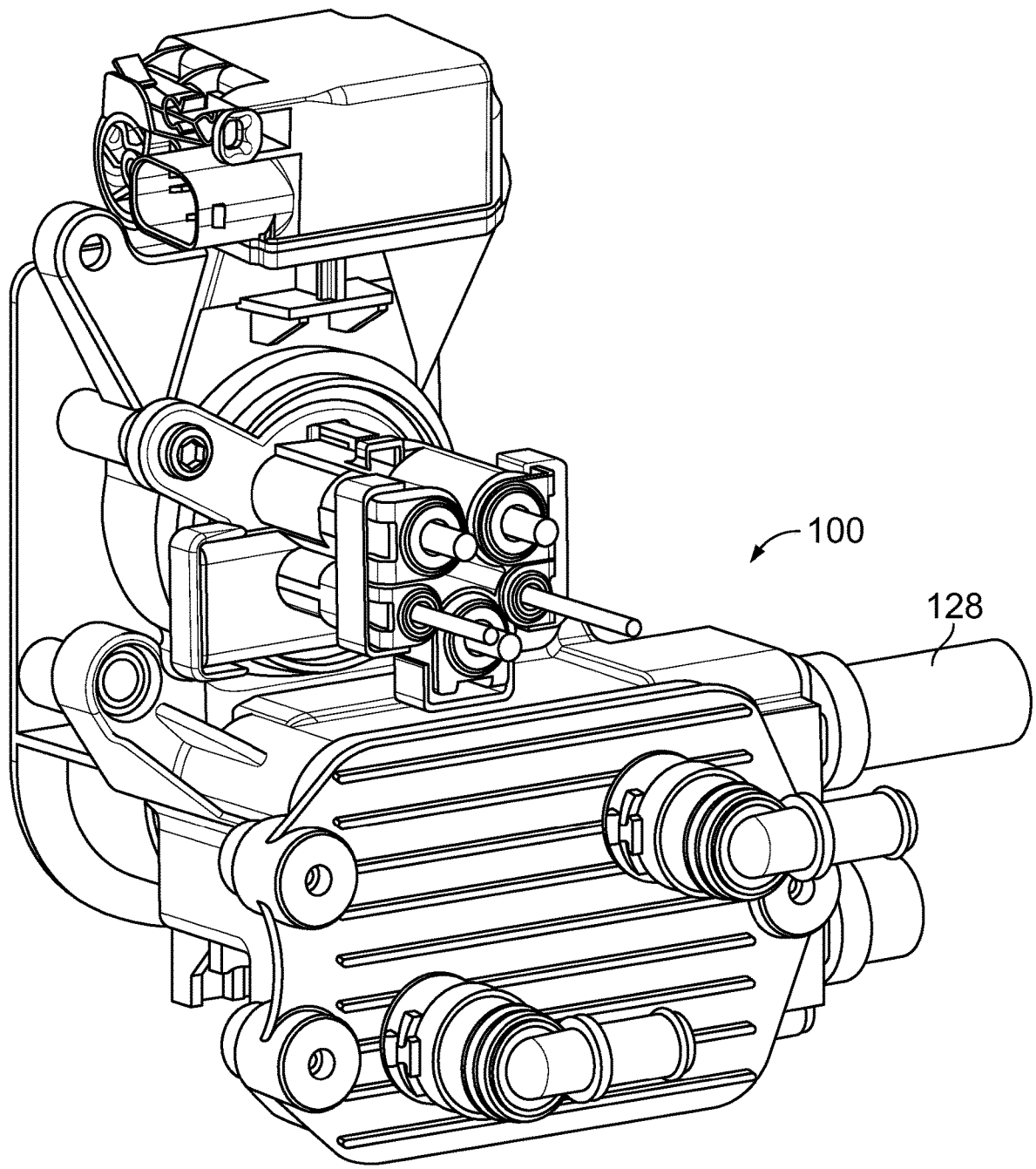
FIG. 11 is a front perspective, exploded view of a portion of the charging inlet assembly showing the DC charging module in accordance with an exemplary embodiment.

FIG. 11 is a front perspective, exploded view of a portion of the charging inlet assembly 100 showing the DC charging module 104 in accordance with an exemplary embodiment. In the illustrated embodiment, the DC cables 128 extend from a side of the DC charging module 104. The DC charging module 104 is a right angle module having the DC cables 128 extending perpendicular to the mating direction/loading direction.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

What is claimed is:

1. A charging inlet assembly comprising:
   a housing extending between a front and a rear, the housing having a DC section and an AC section, the DC section configured for mating with a DC charging connector at the front, the AC section configured for mating with an AC charging connector at the front;
   an AC charging module coupled to the rear of the housing at the AC section, the AC charging module including an AC terminal holder holding AC terminals for mating with the AC charging connector, the AC charging module being removable from the housing wherein the AC terminals are removed from the housing with the AC terminal holder, wherein the AC terminal holder includes securing features configured to secure the AC terminals in the AC terminal holder; and
   a DC charging module coupled to the rear of the housing at the DC section, the DC charging module including a DC terminal holder holding DC terminals for mating with the DC charging connector, the DC charging module being removable from the housing wherein the DC terminals are removed from the housing with the DC terminal holder, and wherein the DC terminal holder includes securing features configured to secure the DC terminals in the DC terminal holder;
   wherein the housing includes blocking elements configured to interface with the corresponding securing features to hold the securing features in securing positions.

2. The charging inlet assembly of claim 1, wherein the AC terminals are pluggable into the AC section of the housing with the AC terminal holder, and wherein the DC terminals are pluggable into the DC section of the housing with the DC terminal holder.

3. The charging inlet assembly of claim 1, wherein the AC terminal holder includes a base coupled to the housing at the rear, the AC terminals including pins at mating ends of the AC terminals, the pins of the AC terminals extending forward of the base, the pins of the AC terminals being located in the AC section of the housing for mating with the AC charging connector, and wherein the DC terminal holder includes a base coupled to the housing at the rear, the DC terminals including pins at mating ends of the DC terminals, the pins of the DC terminals extending forward of the base, the pins of the DC terminals being located in the DC section of the housing for mating with the DC charging connector.

4. The charging inlet assembly of claim 3, wherein the AC terminal holder includes a mating insert extending forward from the base of the AC terminal holder, the mating insert including AC terminal channels receiving corresponding AC terminals, the mating insert being received in an internal cavity of the housing at the AC section, the AC terminal channels configured to receive AC charging terminals of the AC charging connector to mate with the AC terminals.

5. The charging inlet assembly of claim 1, wherein the AC charging module includes a first securing element securing the AC terminal holder to the rear of the housing, the first securing element configured to be released from the housing to allow removal of the AC charging module from the housing, and wherein the DC charging module includes a second securing element securing the DC terminal holder to the rear of the housing, the second securing element configured to be released from the housing to allow removal of the DC charging module from the housing.

6. The charging inlet assembly of claim 1, wherein the securing features of the AC terminal holder includes latches configured to latchably secure the AC terminals in the AC terminal holder, and wherein the securing features of the DC terminal holder includes latches configured to latchably secure the DC terminals in the DC terminal holder.

7. The charging inlet assembly of claim 6, wherein the blocking elements of the housing includes latch blocks configured to interface with the corresponding latches to hold the latches in latched positions.

8. The charging inlet assembly of claim 1, wherein the DC section includes a DC position assurance device and the AC section includes an AC position assurance device, the AC charging module interfacing with the AC position assurance device to assure that the AC charging module is properly loaded in the housing, the DC charging module interfacing with the DC position assurance device to assure that the DC charging module is properly loaded in the housing.

9. The charging inlet assembly of claim 1, wherein the AC charging module includes AC power cables terminated to the corresponding AC terminals, and wherein the DC charging module includes DC power cables terminated to the corresponding DC terminals.

10. The charging inlet assembly of claim 9, wherein the AC charging module includes cable seals between the AC power cables and the AC terminal holder, and wherein the DC charging module includes cable seals between the DC power cables and the DC terminal holder.

11. The charging inlet assembly of claim 1, wherein the AC charging module includes AC terminal seals coupled to the corresponding AC terminals, the AC terminal seals being sealingly coupled to the AC terminal holder, and wherein the DC charging module includes DC terminal seals coupled to the corresponding DC terminals, the DC terminal seals being sealingly coupled to the DC terminal holder.

12. The charging inlet assembly of claim 1, wherein the AC charging module includes a resistor assembly coupled to the AC terminal holder, the resistor assembly including a resistor electrically connected to at least one of the AC terminals.

13. A charging inlet assembly comprising:
    a housing extending between a front and a rear, the housing having a DC section and an AC section, the DC section configured for mating with a DC charging connector at the front, the AC section configured for mating with an AC charging connector at the front, the AC section including an internal cavity;
    an AC charging module coupled to the rear of the housing at the AC section, the AC charging module including an AC terminal holder holding AC terminals for mating with the AC charging connector, the AC terminal holder including a mating insert at a front of the AC charging module, the mating insert including AC terminal channels holding the corresponding AC terminals, the mating insert being received in the internal cavity of the AC section of the housing, the AC terminal channels configured to receive AC charging terminals of the AC charging connector, the AC charging module being removable from the housing wherein the AC terminals are removed from the housing with the AC terminal holder, wherein the AC charging module includes a resistor assembly coupled to the AC terminal holder, the resistor assembly including a resistor electrically connected to at least one of the AC terminals; and a DC charging module coupled to the rear of the housing at the DC section, the DC charging module including a DC terminal holder holding DC terminals for mating with the DC charging connector, the DC charging module being removable from the housing wherein the DC terminals are removed from the housing with the DC terminal holder.

14. The charging inlet assembly of claim 13, wherein the AC terminals are pluggable into the AC section of the housing with the AC terminal holder, and wherein the DC terminals are pluggable into the DC section of the housing with the DC terminal holder.

15. The charging inlet assembly of claim 13, wherein the AC charging module includes a first securing element securing the AC terminal holder to the rear of the housing, the first securing element configured to be released from the housing to allow removal of the AC charging module from the housing, and wherein the DC charging module includes a second securing element securing the DC terminal holder to the rear of the housing, the second securing element configured to be released from the housing to allow removal of the DC charging module from the housing.

16. The charging inlet assembly of claim 13, wherein the DC section includes a DC position assurance device and the AC section includes an AC position assurance device, the AC charging module interfacing with the AC position assurance device to assure that the AC charging module is properly loaded in the housing, the DC charging module interfacing with the DC position assurance device to assure that the DC charging module is properly loaded in the housing.

17. The charging inlet assembly of claim 13, wherein the AC terminal holder includes latches configured to latchably secure the AC terminals in the AC terminal holder, and wherein the DC terminal holder includes latches configured to latchably secure the DC terminals in the DC terminal holder.

18. A charging inlet assembly comprising:
a housing extending between a front and a rear, the housing having a DC section and an AC section, the DC section including a DC position assurance device, the DC section configured for mating with a DC charging connector at the front, the AC section including an AC position assurance device, the AC section configured for mating with an AC charging connector at the front;

an AC charging module coupled to the rear of the housing at the AC section, the AC charging module including an AC terminal holder holding AC terminals for mating with the AC charging connector, wherein the AC charging module interfaces with the AC position assurance device to assure that the AC charging module is properly loaded in the housing, wherein the AC charging module is removable from the housing, the AC terminals being removed from the housing with the AC terminal holder, the AC terminal holder includes securing features configured to secure the AC terminals in the AC terminal holder; and a DC charging module coupled to the rear of the housing at the DC section, the DC charging module including a DC terminal holder holding DC terminals for mating with the DC charging connector, wherein the DC charging module interfaces with the DC position assurance device to assure that the DC charging module is properly loaded in the housing, wherein the DC charging module is removable from the housing, the DC terminals being removed from the housing with the DC terminal holder, the DC terminal holder includes securing features configured to secure the DC terminals in the DC terminal holder;

wherein the housing including blocking elements configured to interface with the corresponding securing features to hold the securing features in securing positions.

19. The charging inlet assembly of claim 18, wherein the AC terminal holder includes a base coupled to the housing at the rear, the AC terminals including pins at mating ends of the AC terminals, the pins of the AC terminals extending forward of the base, the pins of the AC terminals being located in the AC section of the housing for mating with the AC charging connector, and wherein the DC terminal holder includes a base coupled to the housing at the rear, the DC terminals including pins at mating ends of the DC terminals, the pins of the DC terminals extending forward of the base, the pins of the DC terminals being located in the DC section of the housing for mating with the DC charging connector.

20. The charging inlet assembly of claim 18, wherein the securing features of the AC terminal holder includes latches configured to latchably secure the AC terminals in the AC terminal holder, and wherein the securing features of the DC terminal holder includes latches configured to latchably secure the DC terminals in the DC terminal holder, the blocking elements of the housing including latch blocks configured to interface with the corresponding latches to hold the latches in latched positions.

* * * * *